Sept. 1, 1970 TSUNEO AKASHI ET AL 3,526,599
SAMARIUM OXIDE CONTAINING NICKEL-ZINC FERRITE
Filed May 22, 1968 2 Sheets-Sheet 1

INVENTORS
TSUNEO AKASHI
HIDEO TAKAMIZAWA
BY TAKASHI OKADA

Hofgood & Calimafde
ATTORNEY

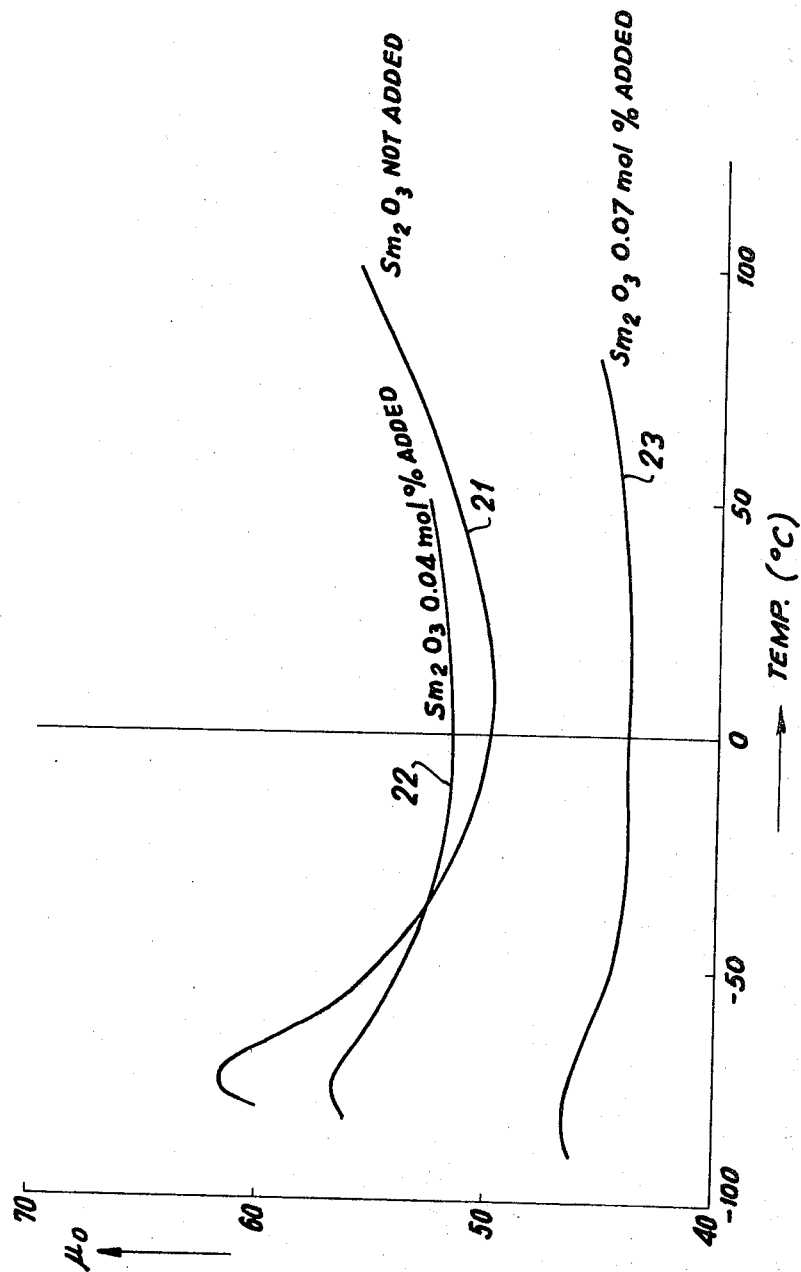

United States Patent Office 3,526,599
Patented Sept. 1, 1970

3,526,599
SAMARIUM OXIDE CONTAINING NICKEL-ZINC FERRITE
Tsuneo Akashi, Hideo Takamizawa, and Takashi Okada, Tokyo, Japan, assignors to Nippon Electric Company, Limited, Minato-ku, Tokyo, Japan, a corporation of Japan
Filed May 22, 1968, Ser. No. 731,052
Claims priority, application Japan, May 25, 1967, 42/33,809
Int. Cl. C04b *35/40*
U.S. Cl. 252—62.57                         4 Claims

ABSTRACT OF THE DISCLOSURE

A nickel-zinc ferrite is disclosed characterized by containing a small but effective amount of samarium oxide, for example about 0.005 to 0.1 mole percent.

---

Figure 1:
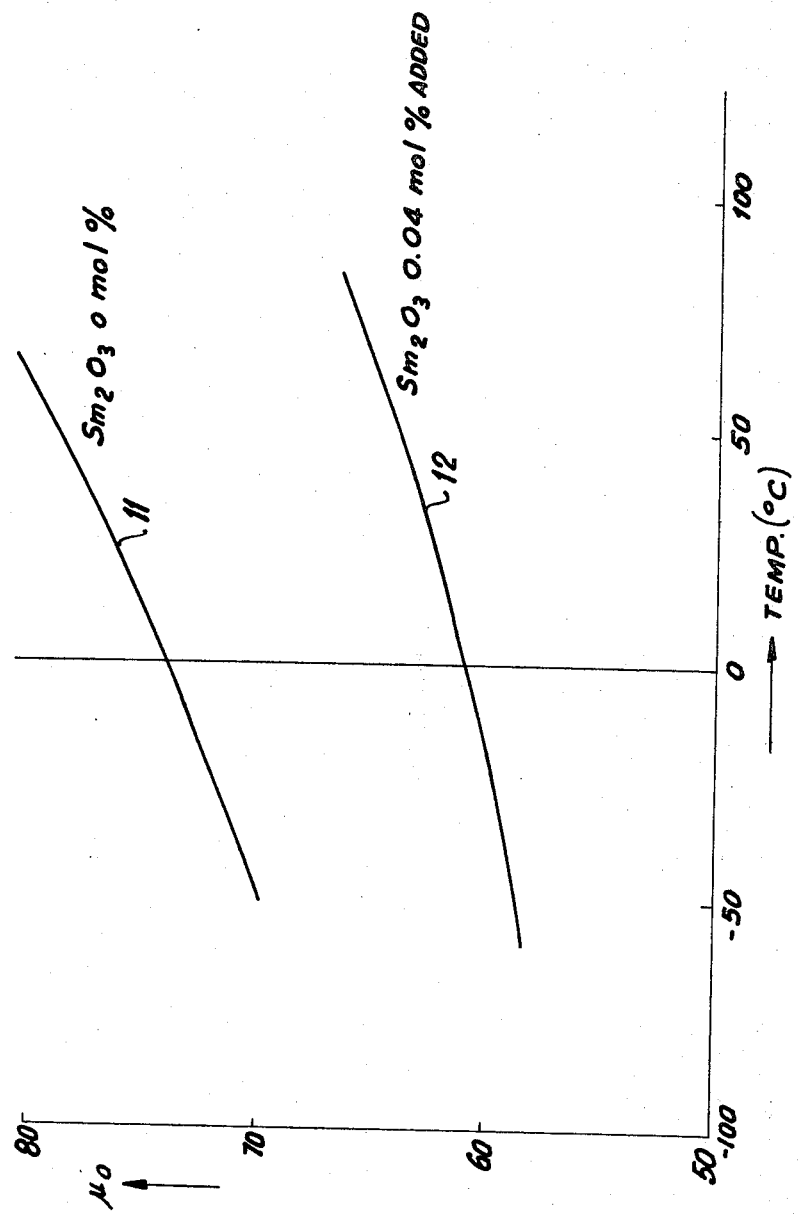

This invention relates to nickel-zinc ferrites composed essentially of iron oxide, nickel oxide, and zinc oxide as magnetic materials for use in high-frequency communications.

In accordance with the invention, samarium oxide is added to nickel-zinc ferrites in order to improve the loss characteristics $(1/\mu Q)$ at high frequency and sharply decrease the temperature coefficient of the initial permeability $\mu$.

Nickel-zinc ferrites are used as low loss magnetic materials in the manufacture of cores of coils for high frequency communication use. The recent tendency for smaller and more compact communication apparatus have urgently called for the development of materials which have low magnetic loss $1/\mu Q$ and small temperature coefficient of initial permeabliity.

These two requirements for the materials are imperative for the miniaturization of coils of magnetic materials for communication use and must be met simultaneously. In other words, any improvement achieved in either respect at the sacrifice of the other would of course fail to prove as such and an improvement in either point alone would not serve for effective miniaturization of the coils.

This may be explained by the following. When materials such as referred to herein above are used as coils for communication use, they are usually employed as pot core types and it is a usual practice to provide an air gap in part of the magnetic path for the adjustment of the required inductance, the stability of inductance for temperature, and quality coefficient Q, and similar properties.

In such instances, the apparent loss $1/Qe$ of the core and the variation of the inductance of the coil with respect to temperature are expressed by Equations 1 and 2 as follows:

$$\frac{1}{Qe} = \frac{(1)}{\mu Q} \cdot \mu e \tag{1}$$

$$\frac{\Delta L}{L\Delta T} = \frac{(\Delta \mu)}{\mu^2 \Delta T} \cdot \mu e \tag{2}$$

where:

$\mu$ is the permeability of the material,
$\mu e$ is the effective permeability of the core,
$\Delta \mu$ is the difference in $\mu$ which results from a difference in measured temperature by $\Delta T$ (° C.).
L is the inductance of the coil, and
$\Delta L$ is the difference in L which results from a difference in measured temperature by $\Delta T$ (° C.).

It thus follows that if a new material capable of reduction in $1/\mu Q$ is developed, a large value can be selected for the $\mu e$ and hence the miniaturization of the core becomes possible so far as the core loss alone is concerned, provided that the core $Qe$ is predetermined as will be apparent from Equation 1. However, the value $\Delta T/L\Delta T$ in this case will increase as will be noted from Equation 2 and hence the value $(\Delta L/L\Delta T)$ will drop unless the temperature coefficient $(\Delta \mu/\mu^2 \Delta T)$ is improved.

In actual core designs, a mere improvement of $1/\mu Q$ alone cannot increase the $\mu e$ and hence any miniaturization of the coil is substantially impossible.

This means that the improvements of the $(1/\mu Q)$ and of the temperature coefficient are like the two wheels of a cart; they must be both improved at the same time.

With this in view, the effects derivable from the addition of various impurities were investigated and it was nunexpectedly found that the addition of small but effective amounts of samarium oxide can satisfy both of the above-noted requirements.

The present invention will be explained in further details by the following disclosure, the drawings and the examples; wherein, FIG. 1 is illustrative of the effects of samarium oxide on nickel-zinc ferrite and shows the changes with temperature of the initial permeability of a test specimen of nickel-zinc ferrite containing about 0.04 mole percent of samarium oxide as compared with the changes when no samarium oxide is present; and FIG. 2 shows the changes with temperature of the initial permeability of test specimens of nickel-zinc ferrite containing a small amount of cobalt oxide with the addition of 0.04 and 0.07 mole percent of samarium oxide as compared with the changes of a test specimen of the same composition without samarium oxide.

EXAMPLE 1

Test specimens were produced having compositions of 56 mole percent ferric oxide, 31 mole percent nickel oxide, and 13 mole percent zinc oxide, with and without the addition of samarium oxide of varying amounts ranging from about 0.005 to 0.2 mole percent. The procedure employed was as follows. The starting materials were proportioned to produce each composition, the materials of each composition being mixed in a steel ball mill. The mixture was calcined at 1000° C. for 4 hours, press-molded, and then sintered in oxygen at 1125° C. for one hour. The initial permeability $\mu$ and quality factor Q of the test specimens thus prepared were measured at at 10 mc. The changes of the initial permeability with temperature were also measured at temperatures within the range of about 0° to 40° C. at 1 kc. to determine the temperature coefficient $\Delta \mu/^2 \mu \Delta T$. The relations between the amount of samarium oxide added and the values of $\mu$, Q, and $\Delta \mu / \mu^2 \Delta T$ are shown in Table 1. Changes of permeability with temperatures of the test specimen without the addition of samarium oxide and the specimen containing 0.04 mole percent of samarium oxide are compared in FIG. 1.

TABLE 1

| Amount of samarium oxide ($Sm_2O_3$) added | $\mu$ | Q | $(1/\mu Q) \times 10^6$ | $(\Delta\mu/\mu^2\Delta T)\times 10^6$ (0 to 40° C.) |
|---|---|---|---|---|
| 0 | 76 | 58 | 227 | 18.5 |
| 0.005 | 75 | 60 | 222 | 18.4 |
| 0.01 | 75 | 63 | 212 | 18.0 |
| 0.02 | 72 | 69 | 201 | 17.5 |
| 0.04 | 62 | 82 | 194 | 14.8 |
| 0.06 | 54 | 93 | 199 | 11.4 |
| 0.1 | 42 | 111 | 218 | 6.3 |
| 0.15 | 36 | 125 | 222 | 1.8 |
| 0.2 | 29 | 135 | 256 | −2.8 |

EXAMPLE 2

Test specimens formed of the same compositions and subjected to the same powdering treatment as in Example 1 were sintered at 1150° C. for 2 hours. The results obtained are shown in Table 2.

TABLE 2

| Amount of samarium oxide ($Sm_2O_3$) added | $\mu$ | Q | $(1/\mu Q) \times 10^6$ | $(\Delta\mu/\mu^2\Delta T) \times 10^6$ (0 to 40° C.) |
|---|---|---|---|---|
| 0 | 85 | 52 | 226 | 20.5 |
| 0.005 | 86 | 55 | 211 | 19.8 |
| 0.01 | 84 | 58 | 206 | 19.0 |
| 0.02 | 85 | 64 | 183 | 19.2 |
| 0.04 | 74 | 76 | 178 | 17.2 |
| 0.06 | 64 | 87 | 178 | 13.6 |
| 0.1 | 48 | 104 | 200 | 6.0 |
| 0.15 | 36 | 128 | 217 | 0.5 |
| 0.2 | 24 | 145 | 288 | −2.5 |

EXAMPLE 3

The effects capable of being achieved by the addition of samarium oxide to different basic compositions were investigated by adding 0.06 mole percent each of samarium oxide to compositions in which the mixing ratio of iron oxide, nickel oxide and zinc oxide was varied. The test specimens were treated in the same way as in Example 1. For each composition, the values of $\mu$, $1/\mu Q$ and $(\Delta\mu/\mu^2\Delta T)$ of the specimens with and without the addition of 0.06 mole percent of samarium oxide are compared in Table 3.

TABLE 3

| | | | $Sm_2O_3$ not added | | | 0.06 mol. percent $Sm_2O_3$ added | | |
|---|---|---|---|---|---|---|---|---|
| ZnO | $Fe_2O_3$ | NiO | $\mu$ | $(1/\mu Q) \times 10^6$ | $(\Delta\mu/\mu^2\Delta T \times 10^6)$ (0 to 40° C.) | $\mu$ | $(1/\mu Q) \times 10^6$ | $(\Delta\mu/\mu^2\Delta T \times 10^6)$ (0 to 40° C.) |
| 12 | 55 | 33 | 76 | 227 | 20.5 | 50 | 167 | 12.0 |
| 14 | 55 | 31 | 82 | 272 | 18.0 | 61 | 205 | 10.6 |
| 16 | 55 | 29 | 146 | 458 | 13.3 | 94 | 260 | 7.8 |
| 18 | 55 | 27 | 180 | 556 | 12.8 | 126 | 379 | 6.5 |
| 20 | 55 | 25 | 200 | 834 | 13.6 | 156 | 641 | 6.5 |
| 19 | 50 | 31 | 160 | 620 | 15.2 | 120 | 463 | 6.2 |
| 17 | 52 | 31 | 142 | 535 | 17.2 | 98 | 360 | 7.1 |
| 15 | 54 | 31 | 103 | 422 | 18.2 | 72 | 225 | 9.4 |
| 14 | 55 | 31 | 82 | 272 | 18.0 | 61 | 205 | 10.6 |
| 13 | 56 | 31 | 76 | 227 | 18.5 | 54 | 199 | 11.6 |
| 11 | 58 | 31 | 64 | 200 | 20.5 | 46 | 172 | 15.0 |
| 9 | 60 | 31 | 52 | 213 | 21.4 | 40 | 150 | 18.6 |
| 7 | 62 | 31 | 45 | 204 | 23.6 | 38 | 144 | 22.4 |

EXAMPLE 4

For the purpose of improving the loss characteristics of nickel-zinc ferrites, the addition of cobalt oxide is often employed. The use of samarium oxide is also effective in such cases. In this example, different amounts of samarium oxide, ranging from 0.005 mole percent to 0.2 mole percent, were admixed to a composition consisting essentially of about 55.7 mole percent of ferric oxide, about 30.8 mole percent of nickel oxide, about 13.0 mole percent of zinc oxide, and less than about 1 mole percent cobalt oxide, e.g. 0.5 mole percent, and the mixtures were treated in the same manner as described in Example 1.

The relations between the amount of samarium oxide added and the values of $\mu$, $1/\mu Q$, and temperature coefficient are given in Table 4.

TABLE 4

| Amount of samarium oxide ($Sm_2O_3$) added | $\mu$ | $(1/\mu Q) \times 10^6$ | $(\Delta\mu/\mu^2\Delta T) \times 10^6$ (0 to 20° C.) | $(\Delta\mu/\mu^2\Delta T) \times 10^6$ (20 to 40° C.) |
|---|---|---|---|---|
| 0 | 50.2 | 67.5 | 3.4 | 10.5 |
| 0.005 | 53.0 | 60.5 | 4.2 | 10.1 |
| 0.01 | 55.5 | 49.0 | 5.0 | 9.8 |
| 0.02 | 55.0 | 49.5 | 6.4 | 9.5 |
| 0.04 | 52.3 | 52.5 | 7.0 | 8.6 |
| 0.06 | 46.5 | 55.2 | 7.1 | 8.1 |
| 0.08 | 41.5 | 58.0 | 6.6 | 7.8 |
| 0.1 | 36.5 | 61.2 | 6.2 | 7.4 |
| 0.15 | 32.0 | 68.2 | 5.5 | 6.4 |
| 0.2 | 28.0 | 74.3 | 4.9 | 5.6 |

For the test specimens with and without the addition of about 0.04 mole percent and 0.07 mole percent of samarium oxide, the changes of initial permeability with temperature are as shown in FIG. 2.

The present invention has been illustrated by the above examples. As will be seen from Examples 1 and 2, the addition of increasing amounts of samarium oxide causes decrease both in the $1/\mu Q$ and in the temperature coefficient. The $1/\mu Q$ decreases with the increase in the amount of addition and has a minimum value where the amount of addition is 0.04–0.06 mole percent. A further increase in the amount of addition conversely raises the $1/\mu Q$ value, but up to 0.1 mole percent the addition improves the $1/\mu Q$ as compared with that of a composition which does not contain the same. As for the temperature coefficient, it decreases in value with the increase in the amount of addition of samarium oxide and passes through zero to a negative value with the addition of 0.2 mole percent. Meanwhile, the addition of samarium oxide causes decrease in the $\mu$ value, but the $\mu$ value of the material itself practically poses no problem, because, as previously described, the product in use is provided with an air gap intentionally to reduce the effective permeability and the core dimension depends on how large the possible $\mu e$ value is.

As illustrated in Example 3, the experiments on the effects of the addition of 0.06 mole percent of samarium oxide to different basic compositions clearly show that the addition of samarium oxide is effective in improving the $1/\mu Q$ and the temperature coefficient $(\Delta\mu/\mu^2\Delta T)$ for the compositions which are within the ranges of 33 to 25 mole percent of nickel oxide, 50 to 62 mole percent of iron oxide, and to 20 mole percent of zinc oxide, as will be seen from Table 3. The test specimen prepared by adding cobalt oxide for the purpose of improving the loss characteristics of nickel-zinc ferrite, although the loss characteristics are improved, behaves in a manner different from the test specimen without cobalt oxide, in respect of the changes in initial permeability with temperature.

FIG. 1 shows the temperature dependency of the $\mu$ values of the test specimens without the addition of samarium oxide (note curve 11) and with the addition of 0.04 mole percent of samarium oxide (note curve 12) in accordance with Example 1.

FIG. 2 shows the temperature dependency of the $\mu$ values of the test specimens prepared by adding 0.47 mole percent of $Co_2O_3$, without the addition of samarium oxide (note curve 21) and with the addition of 0.04 mole percent (note curve 22) and 0.07 mole percent (note curve 23) of samarium oxide in accordance with Example 4. The test specimens in which $Co^{2+}$ is mixed exhibits the peak of the $\mu$ value at a temperature at which the magnetic anisotropic constant $K_1$ comes to zero, that is, the peak appearing in the vicinity of −75° C. in FIG. 2. As can be seen from FIG. 2, the skirt of the peak of the $\mu$ value for the test specimen containing 0.47 mole percent of $Co_2O_3$ without the addition of samarium oxide (curve 21) extends down to the neighborhood of the normal temperature, and therefor the temperature coefficient can be made small with the addition of $Co_2O_3$. However, there is a point of inflection for the $\mu$ value in the vicinity of 0° C. and the temperature coefficient ($\Delta\mu/\mu^2\Delta T$) sharply varies from 0 to $20 \times 10^{-6}$ over the temperature range of 0° to 40° C. In other words, the serviceable temperature range is limited to a very narrow range and the product should not be used with apparatus for service at extensive temperature ranges. The disadvantage of $Co_2O_3$ addition will become manifest upon comparison of curve 11 of FIG. 1 and curve 21 of FIG. 2.

The addition of samarium oxide to such $Co_2O_3$-containing compositions can improve the $1/\mu Q$ value to values greater than those of the compositions to which $Co_2O_3$ alone is added. Moreover, the peak of the $\mu$ value due to the addition of $Co_2O_3$ can be deformed to a very moderate curve as shown by curves 22 and 23 of FIG. 2. As the result, the serviceable temperature range of the product is extended and the absolute values of temperature coefficient can be reduced. The effects achieved by the addition of $Sm_2O_3$ to the $Co_2O_3$-containing specimens should be also apparent from the relation between the temperature coefficient and the amount of addition shown in Table 4.

From the experimental results in the foregoing examples and from the discussion of the results thereby attained, it is clear that the addition of 0.005 to 0.1 mole percent of samarium oxide to the basic compositions of 50 to 62 mole percent of iron oxide, 25 to 33 mole percent of nickel oxide, and 10 to 20 mole percent of zinc oxide can improve both loss characteristics $1/\mu Q$ and permeability temperature coefficient $\Delta\mu/\mu^2\Delta T$ and that the addition of samarium oxide is similarly effective for the compositions to which small amounts of cobalt oxide have been added for the purpose of improving the loss characteristics.

What is claimed is:

1. A nickel-zinc ferrite consisting essentially of a sintered mixture of about 50 to 62 mole percent of iron oxide, 25 to 33 mole percent of nickel oxide, 7 to 20 mole percent of zinc oxide, and 0.005 to 0.1 mole percent of samarium oxide.

2. The nickel-zinc ferrite of claim 1, wherein the amount of samarium oxide ranges from about 0.04 to 0.07 mole percent.

3. The nickel-zinc ferrite of claim 1, wherein said sintered mixture contains less than about 1 mole percent of cobalt oxide.

4. The nickel-zinc ferrite of claim 1, wherein the amount of samarium oxide is approximately 0.06 mole percent.

References Cited

UNITED STATES PATENTS

| | | | |
|---|---|---|---|
| 2,744,873 | 5/1956 | Piekarski | 252—62.62 |
| 2,961,407 | 11/1960 | Piekarski | 252—62.62 |
| 2,989,472 | 6/1961 | Eckert et al. | 252—62.62 |
| 2,995,518 | 8/1961 | Guillaud et al. | 252—62.62 X |
| 3,009,880 | 11/1961 | Lessoff | 252—62.62 |
| 3,142,645 | 7/1964 | Zerbes | 252—62.62 |
| 3,344,072 | 9/1967 | Akashi et al. | 252—62.62 X |

HELEN M. McCARTHY, Primary Examiner

J. COOPER, Assistant Examiner

U.S. Cl. X.R.

252—62.62